United States Patent [19]

Taylor et al.

[11] 4,056,505
[45] Nov. 1, 1977

[54] GLASS-REINFORCED THERMOPLASTIC MOULDING COMPOSITIONS

[75] Inventors: Kenneth John Taylor; Allan Lord, both of Rochdale, England

[73] Assignee: IBA Industrial Products Ltd., England

[21] Appl. No.: 692,143

[22] Filed: June 2, 1976

[30] Foreign Application Priority Data

June 7, 1975 United Kingdom ............ 24531/75

[51] Int. Cl.² .................................................. C08K 7/14
[52] U.S. Cl. ................................ 260/42.18; 260/37 N
[58] Field of Search .......... 260/37 N, 42.18, 31.8 PQ, 260/31.8 N

[56] References Cited

U.S. PATENT DOCUMENTS

| 3,766,135 | 10/1973 | Yamanouchi et al. | 260/42.18 |
|---|---|---|---|
| 3,928,687 | 12/1975 | Wada et al. | 260/42.18 |
| B 257,143 | 3/1976 | Henman et al. | 260/42.18 |

Primary Examiner—Lewis T. Jacobs
Attorney, Agent, or Firm—Diller, Brown, Ramik & Wight

[57] ABSTRACT

A mouldable thermoplastic material and process for making the same. The material comprises from 20% to 90% by weight of polypropylene, polyethylene or polyamide, from 80 to 10% by weight of glass fibre and from 0.05% to 15% by weight of an additive capable of coupling with the glass at a temperature in the range 180° C to 300° C and incapable of forming a homopolymer at that temperature. The additive is selected from oxalic acid and compounds containing the grouping

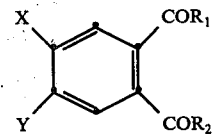

12 Claims, No Drawings

GLASS-REINFORCED THERMOPLASTIC MOULDING COMPOSITIONS

This invention concerns improvements in or relating to glass-reinforced thermoplastic moulding compositions. According to the present invention, we provide a mouldable thermoplastic material comprising from 20 to 90% by weight polyethylene, polypropylene or polyamide as thermoplastic matrix, from 80 to 10% by weight of glass fibre and from 0.05 to 15% by weight, based on he total weight of the glass fibre and thermoplastic matrix, of an additive capable of coupling with the glass at a temperature within the range 180° C to 300° C and incapable of forming a homopolymer at said temperature, said additive being selected from oxalic acid and organic compounds containing the grouping

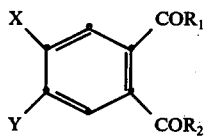

in which X may be hydrogen atom, an alkyl group, a carboxyl group or a group of the formula $-CO-R_3$, $R_3$ being selected from alkyl groups, and aromatic groups with or without carboxyl containing substituents, Y may be a hydrogen atom, an alkyl or a carboxyl group or a group of the formula $-COR_4$, $R_4$ being selected from alkyl groups and aromatic groups with or without carbonyl containing substituents, Or X and Y may together constitute an anhydride grouping thus forming a cyclic anhydride, $R_1$ and $R_2$ may be selected from hydroxyl groups, and aromatic groups, or $-COR_1$ and $-COR_2$ may together constitute an anhydride group thus forming a cyclic anhydride. The present invention also provides a process for manufacturing the mouldable thermoplastic material aforesaid, comprising feeding to an extruder, ooperating at a temperature of from 180° C to 300° C, from 20 to 90 parts by weight of polypropylene, polyethylene or polyamide, from 80 to 10 parts by weight of glass fibre and from 0.05 to 15% by weight on the total weight of polyethylene polypropylene, or polyamide, and glass fibre of an additive which, at said temperature, is capable of coupling with the glass and incapable of forming a homopolymer, compounding these components, and extruding the compounded mixture the additive being selected from oxalic acid and organic compounds containing the grouping noted above.

Preferably the additive is an organic compound having a relatively low molecular weight and a relatively high carboxyl function. That is, the additive preferably has a molecular weight of not more than 400 and a carboxyl function of at least two.

Obviously, the extruder should be operated at an appropriate temperature, i.e. from 180° C to 250° C for polypropylene and from 240° C to 300° C for polyamide, and it is to be noted that the additive should be chosen in each particular case which is capable of withstanding the processing temperature for the polymer concerned.

Preferred additives within the above definition are 3,3', 4,4'-benzophenone tetracarboxylic acid dianhydride (BTDA), oxalic acid, phthalic anhydride, ortho-benzoyl benzoic acid, pyromellitic anhydride.

It will be noted that the additive must be free from reactive double bonds, such as α, β-olefinic unsaturation, to be incapable of homopolymerisation at the extrusion temperature.

Preferred glass fibres for us in this invention are those pretreated with a silane coupling agent.

The effect of the additive used in this invention is generally to increase the tensile and flexural strength of the material. In some cases the impact strength of the material is also improved.

In operating the process of this invention, it is preferred to charge the additive to the extruder together with the thermoplastic, and to melt the thermoplastic to disperse the additive therein before addition of the glass fibre. The additive may be incorporated in the thermoplastic before feeding the latter to the extruder; it should be noted, however, that the additive is not reacted with the thermoplastic, as is done with certain other prior art additives, prior to the supply thereof to the extruder.

The invention will now be particularly described by means of a number of Examples.

EXAMPLES 1 to 4

In the following, Examples 3 and 4 illustrate preferred embodiments of the invention and Examples 1 and 2 are included for comparative purposes. In Examples 1 and 2, polypropylene was fed to the hopper of a twin screw compounding extruder and a silane-treated glass fibre was fed, in the form of roving, to a vent port in the barrel, to effect dispersion of the glass in the polypropylene which was maintained in the barrel at a temperature within the range from 180° C to 250° C. Test specimens were moulded from the resultant moulding material. In Examples 3 and 4, the same technique was employed except that the additive was dry blended with the polypropylene in a high speed mixer, and the resultant mixture was fed to the hopper of the extruder. The compositions, and properties of mouldings made therefrom are set out in Table 1.

It should be noted that in the Table "BTDA" means the compound 3,3', 4,4' benzophenone tetracarboxylic acid anhydride whose structural formula is:

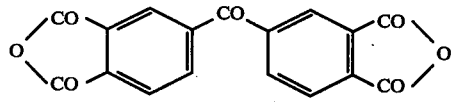

EXAMPLES 5 to 8

In these examples the procedure followed in examples 3 and 4 was repeated using the following additives: ortho-benzoyl benzoic acid, pyromellitic anhydride, phthalic anhydride, the polymer and processing conditions being the same as in examples 3 and 4. Test specimens were moulded from the compositions so produced and the specimens were tested, the results being given in Table 11.

EXAMPLES 9 to 10

In these examples the procedures followed in examples 1 and 4 were repeated except that the polymer used was polyethylene and the processing temperature was correspondingly lower, the polyethylene being maintained in the compounding extruder barrel at a temperature in the range 160° C to 220° C.

Test specimens were moulded from the compositions, as before, and the results of the tests on these specimens are given in table II, example 9 being included for comparison.

EXAMPLES 11, 12 and 13

In these examples the procedures followed in examples 1 and 4 were repeated except that the polymer used was polyamide (nylon 6) and the processing temperature was correspondingly higher, the polymide being maintained in the compounding extruder barrel at a temperature in the range 230° to 265° C.

Test specimens were moulded from the compositions, as before, and the results of the tests on these specimens are given in table III; example 11 being included for comparison.

Table I

| | Example | | | |
|---|---|---|---|---|
| | 1 | 2 | 3 | 4 |
| Additive content (% by weight based on polymer) | 0 | 0 | 10 (BTDA) | 10 (oxalic acid) |
| Glass Fibre content (% by weight based on glass and polymer) | 24.6 | 33.1 | 27.3 | 27.3 |
| Tensile Strength MN/m$^2$ | 35 ± 1 | 35± 1 | 61 ± 1 | 57 ± 2 |
| Tensile Modulus GN/m$^2$ | 5.5 ± 0.3 | 7.3 ± 0.4 | 6.8 ± 0.8 | 6.8 ± 0.3 |
| Flexural Strength MN/m$^2$ | 57 ± 3 | 58 ± 3 | 83 ± 3 | 78 ± 3 |
| Flexural Modulus MN/m$^2$ | 3.8 ± 0.1 | 5.3 ± 0.2 | 5.1 ± 0.2 | 5.3 ± 0.2 |
| Notched Izod Impact Strength J/m | 49 ± 2 | 57 ± 3 | 82 ± 3 | 57 ± 2 |
| Notched Charpy Impact Strength KJ/m$^2$ | 4.0 ± 0.3 | 4.4 ± 0.1 | 5.7 ± 0.3 | 4.5 ± 0.3 |
| Specific Gravity | 1.08 | 1.16 | 1.12 ± 0.02 | 1.16 ± 0.01 |
| Distortion Temp. under load at 0.45 MN/m$^2$ 9° C | 140 | 139 | 141 | 154 |

Table II

| EXAMPLE No. | 9 | 10 | 5 | 6 | 7 | 8 |
|---|---|---|---|---|---|---|
| Polymer | Polyethylene | | Polypropylene | | Polypropylene | |
| Additive | nil | BTDA | Ortho Benzoyl Benzoic | Ortho Benzoyl Benzoic Acid | Pyromellitic Anhydride | Phthalic Anhydride |
| Glass Content % by wt | 26.8 | 25.0 | 30.2 | 29.2 | 29.8 | 29.0 |
| Tensile Strength MPa | 30±3 | 39±1 | 52±1 | 56±2 | 51±3 | 50±2 |
| Tensile Modulus GPa | 4.8±0.2 | 5.7±0.2 | 6.9±0.2 | 6.3±0.3 | 7.0±0.2 | 6.8±02 |
| Flexural Strength MPa | 36±2 | 46±5 | 73±1 | 84±2 | 73±3 | 68±1 |
| Flexural Modulus GPa | 4.2±0.1 | 3.9±0.2 | 5.6±0.1 | 5.0±0.1 | 5.6±0.2 | 5.1±0.1 |
| Notched Charpy Impact Strength KJ/m$^2$ | 6.1±0.5 | 5.5±0.4 | 4.0±0.4 | 4.5±0.3 | 4.2±0.4 | 5.1±0.7 |
| Specific Gravity | 1.13±0.00 | 1.15±0.00 | 1.13±0.01 | 1.13±0.01 | 1.13±0.02 | 1.13±0.01 |
| DTUL at 0.45 MPa° C | — | — | — | — | 153 | 126 |
| % Additive by wt of polymer | 0.0 | 7.0 | 2.5 | 5.0 | 2.0 | 10.0 |

TABLE III

| Example | 1 | 12 | 13 |
|---|---|---|---|
| Polymer | | Polyamide | |
| Additive | — | BTDA | BTDA |
| % Additive by wt (based on total glass and polymer) | nil | 2.0 | 5.0 |
| Glass Fibre content (% by wt based on glass and polymer) | 32.0 | 34.0 | 34.0 |
| Tensile Strength MPa | 148±0 | 160±0 | 168±5; |
| Tensile Modulus GPa | 9.2±0.8 | 10.0±0.5 | 11.2±0.6 |
| Flexural Strength MPa | 243±6 | 263±2 | 247±3 |
| Flexural Modulus GPa | 7.8±0.2 | 8.5±0.3 | 9.6±0.1 |
| Notched 120 impact strength J/m | 193±17 | 167±8 | 166±7 |
| Notched Charpy impac- strength KJ/M$^2$ | 13.8±0.1 | 11.6±0.5 | 10.7±0.4 |

We claim:

1. A mouldable thermoplastic material comprising from 20% to 90% by weight polypropylene, polyethylene or polyamide as thermoplastic matrix, from 80 to 10% by weight of glass fibre and from 0.05 to 15% by weight based on the total weight of the glass fibre and thermoplastic matrix of an additive capable of coupling with the glass at a temperature within the range from 180° C to 300° C and incapable of forming a homopolymer at said temperature, said additive being selected from the groups consisting of oxalic acid and organic compounds containing the grouping

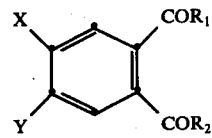

in which X may be a hydrogen atom, an alkyl group, a carboxyl group, or a group of the formula —CO-R$_3$, R$_3$ being selected from alkyl groups, and aromatic groups with or without carbonyl containing substituents, Y may be a hydrogen atom, an alkyl or a carboxyl group or a group of the formula —COR$_4$, R$_4$ being selected from alkyl groups and aromatic groups with or without carbonyl containing substituents, or X and Y may together constitute an anhydride grouping thus forming a cyclic anhydride, R$_1$ and R$_2$ may be selected from hydroxyl groups, aromatic groups or —COR$_1$ and —COR$_2$ may together constitute an anhydride group thus forming a cyclic anhydride.

2. A mouldable thermoplastic material according to claim 1 in which said additive is an organic compound, having a molecular weight not more than 400 and a carboxyl function of at least 2.

3. A mouldable thermoplastic material according to claim 1 in which said additive is 3, 3' 4, 4' benzophenone tetracarboxyein acid dianhydride.

4. A mouldable thermoplastic material according to claim 1 in which said additive is ortho-benzoyl benzoic acid.

5. A mouldable thermoplastic material according to claim 1 in which said additive is pyromellitic anhydride.

6. A mouldable thermoplastic material according to claim 1 in which said additive is phthalic anhydride.

7. A mouldable thermoplastic material according to claim 1 in which the glass fibres in the composition have been pre-treated with a silane coupling agent.

8. A process for manufacturing a moulding composition according to claim 1, which comprises feeding to an extruder operating at a temperature of from 180° C to 300° C, from 20 to 90 parts by weight polypropylene, polyethylene or polyamide from 80 to 10 parts by weight of glass fibre and from 0.05 to 15% by weight on the total weight of polypropylene, polyethylene or polyamide and glass fibre of an additive which at said temperature is capable of coupling with the glass and incapable of forming a homopolymer, compounding these components and extruding the compounded mixture, said additive being selected from the group consisting of oxalic acid and organic compounds containing the grouping

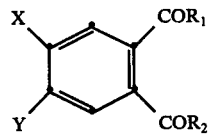

in which X may be a hydrogen atom, an alkyl group, a caboxyl group, or a group of the formula —CO-$R_3$, $R_3$ being selected from alkyl groups, and aromatic groups with or without carbonyl substituents, Y may be a hydrogen atom, an alkyl group or a carboxyl group, or a group of the formula —CO$R_4$, $R_4$ being selected from groups, alkyl groups and aromatic groups with or without carbonyl containing substituents, X and Y may together constitute an anhydride grouping thus forming a cyclic anhydride, $R_1$ and $R_2$ may be selected from hydroxyl groups, aromatic groups, or -COR$_1$ and COR$_2$ may together constitute an anhydride group thus forming a cyclic anhydride.

9. A process according to claim 8 in which the additive is charged to the extruder together with the thermoplastic and the thermoplastic is melted to disperse the additive therein before addition of the glass fibre.

10. A process according to claim 8 in which the additive is incorporated in the thermoplastic before the thermoplastic is fed to the extruder.

11. A mouldable thermoplastic material comprising from 20% to 90% by weight polypropylene, polyethylene or polyamide as thermoplastic matrix, from 80 to 10% by weight of glass fibre and from 0.05 to 15% by weight based on the total weight of the glass fibre and themoplstic matrix of an additive capable of coupling with the glass at a temperature within the range from 180° C to 300° C and incapable of forming a homopolymer at said temperature, said additive being selected from the group consisting of oxalic acid, phthalic anhydride, ortho benzoyl benzoic acid, pyromellitic anhydride and 3, 3', 4, 4' -benzophenone tetracarboxylic acid dianhydride.

12. A process for manufacturing a moulding composition according to claim 11, which comprises feeding to an extruder operating at a temperature of from 180° C to 300° C, from 20 to 90 parts by weight polypropylene, polyethylene or polyamide from 80 to 10 parts by weight of glass fibre and from 0.05 to 15% by weight on the total weight of polypropylene, polyethylene or polyamide and glass fibre of an additive which at said temperature is capable of coupling with the glass and incapable of forming a homopolymer, compounding these components and extruding the compounded mixture, said additive being selected from the group consisting of oxalic acid, phthalic anhydride, ortho benzoyl benzoic acid, pyromellitic anhydride and 3, 3', 4, 4' -benzophenone tetracarboxylic acid dianhydride.

* * * * *

UNITED STATES PATENT AND TRADEMARK OFFICE
CERTIFICATE OF CORRECTION

PATENT NO. : 4,056,505
DATED : November 1, 1977
INVENTOR(S) : Kenneth John Taylor and Allan Lord It is certified that error appears in the above-identified patent and that said Letters Patent are hereby corrected as shown below:

[73] Assignee: TBA Industrial Products Ltd., England

Column 1, line 42, change "ooperating" to ---operating---

Column 5, line 3, change "tetracarboxyein" to ---tetracarboxylic---.

Column 6, line 1, delete "groups" (first occurrence).

Column 6, line 21, change "themoplstic" to ---thermoplastic---.

Column 1, line 30, "The present invention also pro-" should be a new paragraph.

Column 2, line 7, change "us" to ---use---.

Signed and Sealed this

Fourteenth Day of March 1978

[SEAL]

Attest:

RUTH C. MASON
Attesting Officer

LUTRELLE F. PARKER
Acting Commissioner of Patents and Trademarks